June 18, 1929.　　D. B. SALSTROM　　1,717,736
CARVING MACHINE BIT
Filed Oct. 24, 1928

Witness
William P. Kilroy

Inventor,
D. B. Salstrom.
By Tindall Parker Carlson
Attys.

Patented June 18, 1929.

1,717,736

UNITED STATES PATENT OFFICE.

DAVID B. SALSTROM, OF CHICAGO, ILLINOIS, ASSIGNOR TO SALSTROM CARVING MACHINE COMPANY, OF CHICAGO, ILLINOIS, A CORPORATION OF ILLINOIS.

CARVING-MACHINE BIT.

Application filed October 24, 1928. Serial No. 314,572.

This invention relates to rotary cutting tools, such as are used in wood-carving machines. The prior art is illustrated in the Anderson Patent No. 788,873, which shows a cup-shaped socket having an integral supporting shank adapted to be secured in the chuck carried by the carving machine spindle. The inner walls of the socket taper toward the bottom of the socket. In the bottom of the socket is a hole having screw-threaded walls. The cup is intended to receive a frusto-conical member having at its smaller end a screw to enter the screw-threaded opening just referred to. The two cutting tools are clamped between the frusto-conical member and the interior walls of the socket. This construction proved objectionable, since the frusto-conical member could be screwed into and out of the socket only by passing a rod or other implement into the space between the cutting tools and exerting leverage on such implement to turn the tools and the wedge member. In this operation the cutting tools were frequently broken. Moreover, it was uneconomical to make the socket member on a screw machine and hence the construction was relatively expensive.

One of the objects of my invention is to produce a construction wherein a rotatable clamping member can be rotated to clamp or unclamp the cutting tool by means of a wrench and without the necessity of imposing any stresses upon the cutting tools.

Another object of my invention is to reduce the cost of carving machine bits by the use of a construction of such nature that the parts can be made relatively cheaply upon a screw machine.

In the accompanying drawings.

Figure 1:
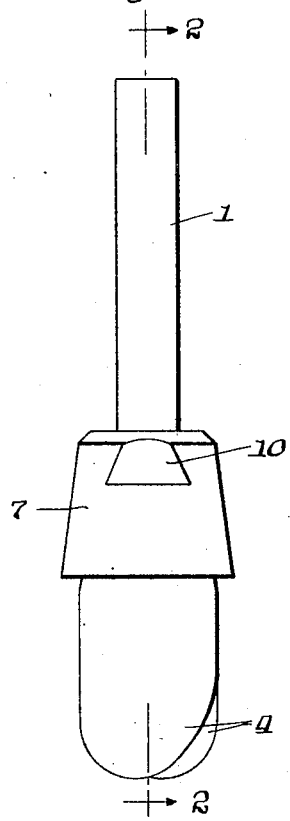
Figure 1 is an elevation of a carving machine bit embodying the features of my invention.
Figure 2:
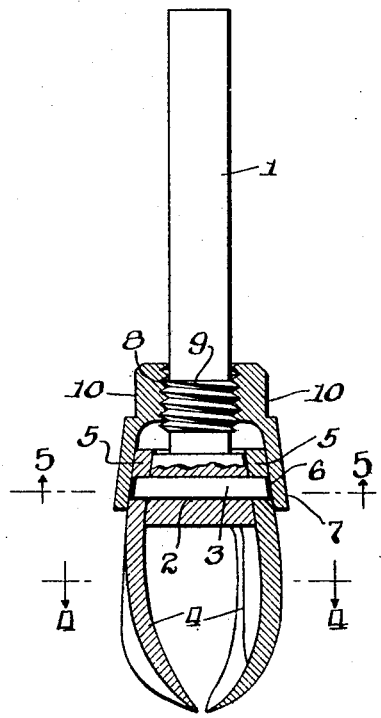
Fig. 2 is a sectional view taken in the plane of line 2—2 of Fig. 1.
Figure 3:
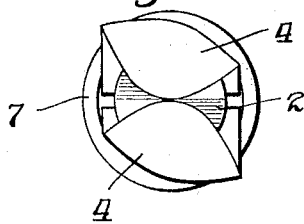
Fig. 3 is a lower end view.
Figure 4:
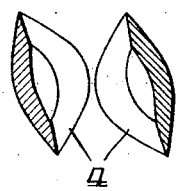
Fig. 4 is a section on line 4—4 of Fig. 2.
Figure 5:
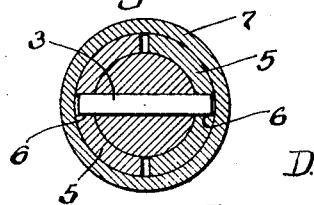
Fig. 5 is a section on line 5—5 of Fig. 2.

A bit comprises a shank 1 adapted to be secured in the chuck of a carving machine spindle. Integral with the lower end of the shank 1 is a frusto-conical portion 2, the upper end of which is smaller than the lower end thereof. A pin 3 extends diametrically through the frusto-conical portion 2, the ends of said pin projecting beyond the periphery of the portion 2.

The cutting tools 4 have tapering shanks 5 of approximately semi-circular form to fit upon the frusto-conical portion 2. In the shank of each cutting tool 4 is an opening 6 to receive one end of the pin 3.

The shanks 5 of the cutting tool are clamped in place by means of a socket member 7, which is interiorly tapered to conform to the taper and curvature of the shanks 5. In the bottom of the socket member 7 is an opening 8 through which the shank 1 may be slipped, the walls of said opening being screw threaded to engage threads 9 formed upon the shank 1 adjacent to the frusto-conical portion 2. Upon the exterior of the socket member 7 are two diametrically opposite flattened surfaces 10 for engagement by a wrench.

Assuming that it is desirable to remove the cutting tools 4 for sharpening or replacement, the shank 1 is secured in a vise, a wrench is applied to the surfaces 10, and the socket member 7 unscrewed and slipped away from the frusto-conical portion 2. The tools 4 may then be slipped off the projecting ends of the pin 3. After resharpening, the tools may be replaced upon the frusto-conical portion 2, and the socket member 7 screwed into position to clamp the cutting tools firmly in place.

It will be seen that the operation of clamping and unclamping the cutting tools may be carried out very conveniently and without danger of damage to the cutting tools. It will also be apparent that the shank 1 with its frusto-conical portion 2 and screw-threaded portion 9 and the socket member 7 can both be made upon a screw machine.

I claim as my invention:

A carving-machine bit comprising a shank having a frusto-conical portion, diametrically opposite projections upon said frusto-conical portion, cutting tools having shanks adapted to lie in contact with said frusto-conical portion and having openings to receive said projections, and a tapered socket member having a screw-thread connection with the first mentioned shank adjacent to said frusto-conical portion, and adapted to surround the cutting-tool shanks and clamp the latter in place, said socket member being adapted for engagement by a wrench.

In testimony whereof, I have hereunto affixed my signature.

DAVID B. SALSTROM.